United States Patent
Michaelis et al.

(10) Patent No.: US 7,675,411 B1
(45) Date of Patent: Mar. 9, 2010

(54) ENHANCING PRESENCE INFORMATION THROUGH THE ADDITION OF ONE OR MORE OF BIOTELEMETRY DATA AND ENVIRONMENTAL DATA

(75) Inventors: Paul Roller Michaelis, Louisville, CO (US); Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 347 days.

(21) Appl. No.: 11/676,685

(22) Filed: Feb. 20, 2007

(51) Int. Cl.
*G08B 1/08* (2006.01)

(52) U.S. Cl. ............. 340/539.12; 340/439; 340/539.22; 340/573.1; 379/38; 379/52; 379/106.02; 379/373.02; 455/414.1

(58) Field of Classification Search ............ 340/539.12, 340/539.22, 573.1, 439, 575; 455/404.1, 455/456.1, 414.1; 379/33–52, 373.01, 367.01, 379/373.02, 106.02, 201.02, 376.02
See application file for complete search history.

(56) References Cited

U.S. PATENT DOCUMENTS

| 4,468,804 | A | 8/1984 | Kates et al. |
|---|---|---|---|
| 4,696,039 | A | 9/1987 | Doddington |
| 4,852,170 | A | 7/1989 | Bordeaux |
| 5,018,200 | A | 5/1991 | Ozawa |
| 5,206,903 | A | 4/1993 | Kohler et al. |
| 5,583,969 | A | 12/1996 | Yoshizumi et al. |
| 5,684,872 | A | 11/1997 | Flockhart et al. |
| 5,828,747 | A | 10/1998 | Fisher et al. |
| 5,905,793 | A | 5/1999 | Flockhart et al. |
| 5,982,873 | A | 11/1999 | Flockhart et al. |
| 6,064,731 | A | 5/2000 | Flockhart et al. |
| 6,084,954 | A | 7/2000 | Harless et al. |
| 6,088,441 | A | 7/2000 | Flockhart et al. |
| 6,151,571 | A | 11/2000 | Pertrushin |
| 6,163,607 | A | 12/2000 | Bogart et al. |
| 6,173,053 | B1 | 1/2001 | Bogart et al. |
| 6,192,122 | B1 | 2/2001 | Flockhart et al. |
| 6,259,969 | B1 | 7/2001 | Tackett |
| 6,275,806 | B1 | 8/2001 | Pertrushin |
| 6,275,991 | B1 | 8/2001 | Erlin |

(Continued)

FOREIGN PATENT DOCUMENTS

CA      1333425      12/1994

(Continued)

OTHER PUBLICATIONS

U.S. Appl. No. 10/756,669, filed Jan. 12, 2004, Thambiratnam.

(Continued)

*Primary Examiner*—Brent Swarthout
(74) *Attorney, Agent, or Firm*—Sheridan Ross P.C.

(57) ABSTRACT

One or more of telephony functions and communication routing management are controlled by one or more of presence information, environmental information and physiological information. An analysis of the one or more of presence information, environmental information and physiological information is compared with a profile and the one or more of telephony functions and communication routing modified in accordance with a rule set associated with the profile. The environmental and physiological information can be acquired by a communications device associated with a person or through the communications device communicating with one or more dedicated environmental or physiological sensors.

21 Claims, 5 Drawing Sheets

U.S. PATENT DOCUMENTS

| | | | |
|---|---|---|---|
| 6,278,777 | B1 | 8/2001 | Morley et al. |
| 6,292,550 | B1 | 9/2001 | Burritt |
| 6,353,810 | B1 | 3/2002 | Petrushin |
| 6,374,221 | B1 | 4/2002 | Haimi-Cohen |
| 6,389,132 | B1 | 5/2002 | Price |
| 6,427,137 | B2 | 7/2002 | Pertrushin |
| 6,463,415 | B2 | 10/2002 | St. John |
| 6,480,826 | B2 | 11/2002 | Pertrushin |
| 6,697,457 | B2 | 2/2004 | Pertrushin |
| 6,766,014 | B2 | 7/2004 | Flockhart et al. |
| 6,889,186 | B1 | 5/2005 | Michaelis |
| 2002/0194002 | A1 | 12/2002 | Petrushin |
| 2004/0209594 | A1* | 10/2004 | Naboulsi ............... 455/404.1 |
| 2004/0215453 | A1 | 10/2004 | Orbach |
| 2004/0252824 | A1* | 12/2004 | Hummel ............... 379/376.02 |
| 2004/0264662 | A1* | 12/2004 | Silver ................. 379/142.06 |
| 2005/0177029 | A1* | 8/2005 | Shen ....................... 600/300 |
| 2005/0245839 | A1* | 11/2005 | Stivoric et al. ............ 600/549 |
| 2006/0146988 | A1* | 7/2006 | Matthews ................ 379/67.1 |
| 2007/0037605 | A1* | 2/2007 | Logan ...................... 455/567 |
| 2008/0218309 | A1* | 9/2008 | Steenstra et al. ........... 340/5.8 |

FOREIGN PATENT DOCUMENTS

| | | |
|---|---|---|
| EP | 0076687 | 4/1983 |
| EP | 0140249 | 5/1985 |
| EP | 0360265 | 3/1990 |
| JP | 10-124089 | 5/1998 |

OTHER PUBLICATIONS

"Agile Lie Detector"; Available at: http://www.agilemobile.com/agile_liedetector.html; 2004; 1 page; Agilemobile.com.

"De-FIB-ulator Portable Lie Detector"; Available at: http://www.sharperimage.com/us/en/catalog/product/sku_AR002; 2006; 2 pages; The Sharper Image.

"Dialing Under The Influence"; Available at: http://www.virginmobile.com.au/services/duti.html; 2006; 2 pages; Virgin Mobile.

"Lie Detection And A Major Breakthrough In Price and Portability!"; Available at: http://www.pimall.com/nais/e.pse.html; 2006; Thomas Investigative Publications, Inc.; Austin, TX.

"Module 3"; Available at: http://www.dendrites.com/mod3r.html; Undated; 244 pages.

"Module 4, Autonomic Nervous System: Clinical Implications and Non Pharmaceutical Applications."; Available at: http://www.dendrites.com/module4.htm; Undated; 39 pages.

"Assistive Writing," AbilityHub.com (printed Apr. 11, 2005), available at http://www.abilityhub.com/speech/speech-Id.htm, 2 pages.

"Automatic Speech Recognition," Technology Access Program, AbilityHub.com (Fall 2002), available at http://tap.gallaudet.edu/SpeechRecog.htm, 2 pages.

"Contrasts in Pronunciation," (undated), available at http://www.bohemica.com/czechonline/reference/pronunciation/contrasts.htm, 2 pages.

"Inside Speech Recognition," (printed Apr. 11, 2005), available at http://fsug.org/usyd.edu.au/documentation/HOWTO/Speech-Recognition-HOWTO/inside...., 2 pages.

"Speech Recognition," (printed Apr. 11, 2005) available at http://murray.newcastle.edu.au/user/staff/speech/home_pages/tutorial_sr.html, 5 pages.

Arslan, Levent M., "Foreign Accent Classification in American English," thesis, pp. 1-200, Department of Electrical Computer Engineering, Duke University, 1996.

Arslan, Levent M., et al., "Language Accent Classification in American English," Robust Speech Processing Laboratory Department of Electrical Engineering, Durham, North Carolina, Technical Report RSPL-96-7(1996).

Aviation Safety Investigation Report; Available at: http://64.233.167.104/search?q=cache:xL7YYq5EvwsJ:www.atsb.gov.au/aviation/pdf/200204328.pdf+%22speech+analysis%22+%22detect%22+and+%22state+of+intoxication%22&hl=en&gl=us&ct=clnk&cd=1; Undated; 151 pages; Australian Transport Safety Bureau.

Hansen, John H.L., et al., "Foreign Accent Classification Using Source Generator Based Prosodic Features," IEEE Proc. ICASSP, vol. 1, Detroit U.S.A., (1995), pp. 836-839.

Hollien H.; "Production of intoxication states by actors—acoustic and temporal characteristics,"; J. Forensic Sci.; Jan. 2001; 46(1); pp. 68-73; Two-page internet summary available at http://www.ncbi.nlm.nih.gov/entrez/query.fcgi?db=pubmed&cmd=Retrieve&dopt=Abstract&list_uids=11210927&query_hl=3&itool=pubmed_ExternalLink.

Hosom, John-Paul, et al., "Training Neural Networks for Speech Recognition," Center for Spoken Language Understanding, Oregon Graduate Institute of Science and Technology (Feb. 2, 1999), 51 pages.

Jackson, Philip J.B., et al., "Aero-Acoustic Modeling of Voiced and Unvoiced Fricatives Based on MRI Data," University of Birmingham and University of Southampton, (undated), 4 pages.

Johnson K.; "Do voice recordings reveal whether a person is intoxicated? A case study."; Phonetica; 1990; 47(3-4); pp. 215-237; One-page internet summary available at http://www.ncbi.nlm.nih.gov/entrez/query.fcgi?db=pubmed&cmd=Retrieve&dopt=Abstract&list_uids=2130381&query_hl=5&itool=pubmed_ExternalLink.

Kirriemuri, John, "Speech Recognition Technologies," TSW Mar. 2003, 13 pages.

Lamel, L.F., et al., "Language Identification Using Phone-based Acoustic Likelihoods," ICASSP-94.

Laramee, François Dominic, "Speech Interfaces for Games—Part 1: How Speech Recognition Words," GIGnews.com (2000), available at http://www.gignews.com/fdlspeech2.htm, 5 pages.

Loizou, Philip, "Speech Production and Perception," EE 6362 Lecture Notes (Fall 2000), pp. 1-30.

Markowitz, J., "Glossaries," available at http://www.jmarkowitz.com/glossary.html, 4 pages.

Michaelis, Paul Roller, "Speech Digitization and Compression," Avaya Laboratories (undated), pp. 1-5.

Noth, E., et al., "Research Issues for the Next Generation Spoken"; University of Erlangen-Nuremberg, Bavarian Research Centre for Knowledge-Based Systems, at http://www5.informatik.uni-erlangen.de/literature/psdir/1999/Noeth99:RIF.ps.gz, downloaded Feb. 10, 2003.

Pervasive, Human-Centered Computing, MIT Project Oxygen, MIT Laboratory for Computer Science, Jun. 2000.

Pisoni DB.; "Effects of alcohol on the acoustic-phonetic properties of speech: perceptual and acoustic analyses."; Alcohol Clin Exp Res.; Aug. 1989; 13(4); pp. 577-587; One-page internet summary available at http://www.ncbi.nlm.nih.gov/entrez/query.fcgi?db=pubmed&cmd=Retrieve&dopt=Abstract&list_uids=2679214&query_hl=7&itool=pubmed_ExternalLink.

Zue, Victor, "The MIT Oxygen Project," MIT Laboratory for Computer Science, Apr. 25-26, 2000.

* cited by examiner

ENHANCING PRESENCE INFORMATION THROUGH THE ADDITION OF ONE OR MORE OF BIOTELEMETRY DATA AND ENVIRONMENTAL DATA

FIELD OF THE INVENTION

An exemplary embodiment of the present invention is directed toward telephony devices, services and methods, and, more specifically, to the enhancing of telephony functions. The enhancing can be based on one or more of presence information, biotelemetry data and environmental data.

BACKGROUND

Telephones, and in particular cellular phones, can be programmed to reflect a user's preferences. For example, a cellular phone can be programmed with specific ring tones, can be enabled to either ring, vibrate, or both, upon receipt of an incoming call, can change colors, and the like. Users can save these preferences on the phone and the phone will behave in accordance with the saved preferences.

SUMMARY

On occasion, and as an example, a person may not want their phone to ring even though the ringer may not be turned off. Some of these occasions, such as when the person is sleeping or jogging, can be predicted by one or more of physiological data associated with the person and environmental data. An exemplary aspect of this invention collects one or more of physiological data and environmental data and uses it in conjunction with other presence indicators to determine whether a person is, for example, available for a call. These basic concepts can be extended to any telephony function and can be based on one or more of physiological data, environmental data and presence indicators.

"Presence" and presence information relates to the person having multiple devices with multiple communication paths and a user's preference/preferred devices and availability. "Presence information" typically refers to any information associated with a network node and/or endpoint device, such as a communications device, that is in turn associated with a person or entity. Examples of presence information include registration information under the session initiation protocol (SIP), information regarding the accessibility of the endpoint device, the endpoint's telephone number or address, the recency of use of the endpoint device by the person, recency of authentication by the person to a network component, and the preferences of the person, such as contact mode preferences or profiles such as the communication device to be contacted for specific types of contacts or under specific factual scenarios or presence context, contact time preferences, impermissible contact types and/or subjects such as the subjects about which the person does not wish to be contacted, parties who must not contact, i.e., do not call if you are calling on behalf of XYZ company, and parties who can contact at any time, e.g., I will accept a call from the head of company X regardless of what I am doing. Presence information can be user configurable, i.e., the user can configure the number and type of communication and message devices with which he or she can be contacted and to define different profiles that define the communication and messaging options presented to the incoming contactor in specified factual situations or sets of facts. By identifying a pre-defined set of facts, the pertinent profile can be followed to direct the contact to the user-preferred device.

"Call" or "contact" means a connection or request for connection between two or more communication devices. As will be appreciated, the contacts can be of various types and forms, such as wireline or wireless circuit and packet-switched voice contacts, e-mail, faxes, instant messages, video messages, paging signals, VOIP sessions, chat sessions, video conferences, multimedia multi-part messages, and cross-media messages. Moreover, "available intelligence" can be combined with the presence information, where available intelligence refers to processed, e.g. compiled, cross-referenced and/or filtered, presence information or meta-information. Policy rules associated with the callee's name space can then be mapped against one or more of the presence information, intelligence information, physiological data and environmental data to determine, for example, availability of or call handling for, for example, a callee.

Session initiation protocol (SIP) is a signaling protocol that can be used for establishing sessions in an IP network. The session can be a simple two-way telephone call or, for example, could be a multi-party-multi-media conference session. SIP protocols are well known and allow the ability to establish sessions in a host of different service options such as voice-enriched e-commerce, web page click-to-dial, instant messaging, IP centrex services, and the like. The exemplary embodiments of the systems and methods of this invention can use SIP protocols and the associated SIP servers, such as presence servers and database(s), to implement the functionality and messaging described herein. Additionally, the determination as to whether a particular telephony function is available may not be limited to the identification of, for example, traditional presence information, but can also be based on one or more of additional presence information combined with physiological data, environmental data, and the like.

As another example, one aspect of the invention allows a telephony function, such as a phone's ringer, to be controlled based on physiological data collected from a telephone user. The ringer on a hospital patient's phone, for example, could be disabled when the patient is sleeping or ill. The ringer on a jogger's cell phone can be disabled or the volume increased when the jogger's heart rate, measured by a heart monitor or the phone itself, exceeds a certain setting.

An exemplary aspect of the invention is thus related to controlling telephony functions.

More specifically, an exemplary aspect of the invention relates to controlling telephony functions based on physiological data.

Additional aspects of the invention relate to controlling one or more telephony functions based on environmental data.

Still further aspects of the invention relate to controlling one or more telephony functions based on one or more of physiological data and environmental data.

Still further aspects of the invention relate to controlling call routing based on one or more of physiological data and environmental data.

Further aspects of the invention relate to specifying contact preferences based on one or more of physiological data and environmental data, and the ability to send a message indicating a callee's preferred communication method.

Additional aspects of the invention relate to incorporating one or more of physiological data acquisition and environmental data acquisition modules into the communications device, such as a telephone.

Still further aspects of the invention relate to converting physiological data and environmental data into a format usable by a communications device, such as a telephone.

Even further aspects of the invention relate to receiving physiological data and environmental data by a communications device, such as a telephone.

These and other features and advantages of this invention are described in, or are apparent from, the following detailed description of the exemplary embodiments. The embodiments and configurations herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures wherein.

DETAILED DESCRIPTION

Figure 1:
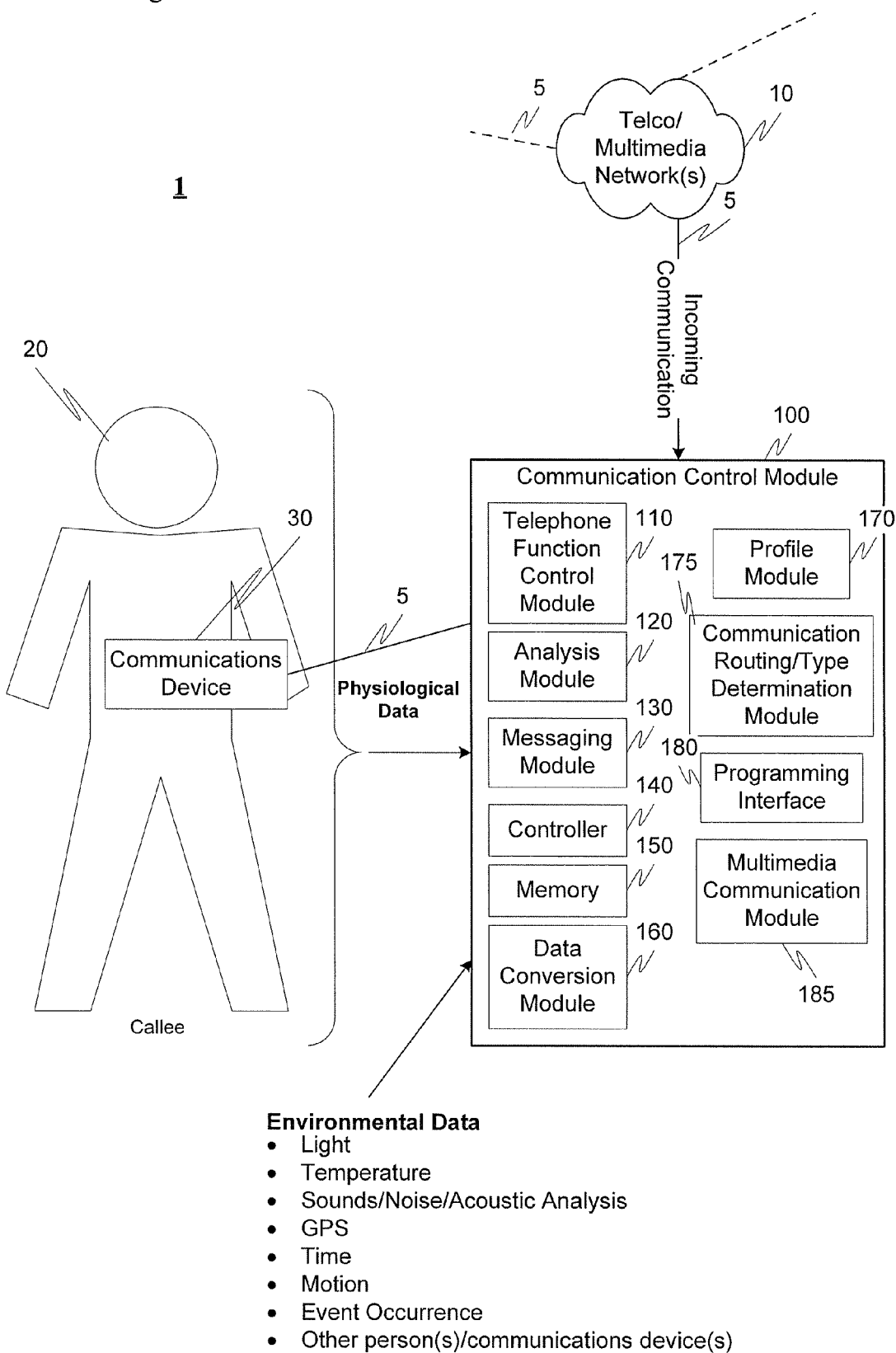
FIG. 1 is a block diagram illustrating an exemplary embodiment of a communication preference system according to this invention.

The exemplary embodiments of this invention will be described in relation to controlling telephony functions and call routing. However, it should be appreciated, that in general, the systems and methods of this invention will work equally well for any type of communication system in any environment.

The exemplary systems and methods of this invention will also be described in relation to telecommunications systems and associated communication hardware, software and communication channels. However, to avoid unnecessarily obscuring the present invention, the following description omits well-known structures, network components and devices that may be shown in block diagram form, are well-known, or can otherwise be summarized. For purposes of explanation, numerous details are set forth in order to provide a thorough understanding of the present invention. It should be appreciated, however, that the present invention may be practiced in a variety of ways beyond the specific details set forth herein. Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecure and/or encrypted system. Thus, it should be appreciated, that the components of the system can be combined in to one or more devices, such as a PBX or voicemail system, or collocated on a particular node of a distributed network, such as an analog and/or digital telecommunications network, a packet-switch network, or a circuit-switched network. As will be appreciated from the following description, and for reasons of computational efficiency, the components of the system can be arranged at any location within a distributed network without affecting the operation of the system. For example, the various components can be located in a PBX, in one or more communications devices, at one or more users' premises, or some combination thereof. Similarly, one or more functional portions of the system could be distributed between a telecommunications device(s) and an associated computing device.

It should also be appreciated that the various links, including the various communications channels and link 5, connecting the elements, can be wired or wireless links, or any combination thereof, or any other known or later developed element(s) or system that is capable of supplying and/or communicating data to and from the connected elements. The term "module" as used herein can refer to any known or later developed hardware, software, firmware, artificial intelligence, fuzzy logic, or combination thereof that is capable of performing the functionality or analyzing information associated with that element. The terms "determine", "calculate" and "compute," and variations thereof, as used herein, are used interchangeably and include any type of methodology, process, mathematical operation or technique. Furthermore, it is to be noted that the term "a" or "an" entity refers to one or more of that entity. As such, the terms "a" or "an", "one or more" and "at least one" can be used interchangeably herein. It is also to be noted that the terms "comprising", "including" and "having" can be used interchangeably.

Also, while the flowcharts have been discussed and illustrated in relation to a particular sequence of events, it should be appreciated that changes, additions, and omissions to this sequence can occur without materially affecting the operation of the invention.

FIG. 1 illustrates an exemplary embodiment of the communication preference system 1. The communication preference system 1 comprises a communication control module 100, one or more callees, such as a callee 20, a communication device 30 associated with callee 20, and one or more telecommunication/multimedia networks 10, all interconnected via links 5.

The communication control module 100 comprises a telephone function control module 110, an analysis module 120, a messaging module 130, a controller 140, a memory 150, a data conversion module 160, a profile module 170, a communication routing/type determination module 175, a programming interface 180, and a multimedia communication module 185.

The communications device 30 can be any communication device capable of receiving and/or sending a communication including, but not limited to, a wired or wireless telephone, PDA, multimedia equipped communications device, or in general any device used for communication.

The communications device 30 can be equipped with one or more sensors, and optionally data conversion modules, that allow for the collection of one or more of physiological data and environmental data. The communications device 30 can also be equipped with data conversion capabilities to one or more of convert or filter the collected data into a format usable by the communication control module.

An example of physiological data includes heartbeat, blood pressure, temperature, and in general any biological or physiological data that can be obtained from callee 20. Environmental data can include, but is not limited to, light, temperature, sounds, noise, acoustic analysis, global positioning system information, time, motion, event occurrence and status or presence information related to other persons and/or communications devices.

While the exemplary embodiment described hereinafter is directed toward the handling of an incoming communication, it should be appreciated that the techniques of this invention can also be applied to outgoing communications from the callee 20.

In operation, an incoming communication is detected by the communication control module 100. The analysis module 120 analyzes one or more of physiological data, presence information and environmental data associated with callee 20 and, with the cooperation of controller 140, memory 150, data conversion module 160 and profile module 170 determines whether an automatic action is to be taken based on a combination of the analyzed data and the callee's preferences stored in profile module 170. If an automatic action is to be taken, the call can, for example, be terminated, i.e., delivered successfully to a desired endpoint or destination, in accordance with information in the callee's profile and in cooperation with one or more of the communication routing/type determination module 175 and telephone function control module 110.

Alternatively, one or more of the presence indicators, physiological data and environmental data can be analyzed by the analysis module 120 and compared to information within the callee's profile in profile module 170. An appropriate termination for the call can then be determined and the call terminated accordingly.

The termination of the call can be handled in various ways and with differing degrees of modification to telephony functions. For example, the phone can be rung, the incoming call can be forwarded to voicemail, a message can be returned to the caller that the callee is unavailable, a custom message can be returned to the caller, and/or the telephony function can be adjusted and the call terminated with the modified telephony function. For example, based on one or more of physiological data information, environmental data information and caller information, a custom message can be returned to the caller. These custom messages can, for example, be stored in the profile module 170 and customized by the callee. For example, the callee may want to establish that for certain incoming communications from certain people, more specific information about their unavailability be returned to the caller. This can be in addition or as an alternative to a generic unavailable message, which can be used for all other callers not predefined and stored within the profile module 170.

The modified telephony function can also taken into consideration one or more of presence information, physiological data information and environmental data information and modify the behavior of the communications device 30 upon receipt of an incoming communication. These modifications can include, but are not limited to, volume controls, ring controls, speech-to-text, or in general any function associated with the communications device.

For example, if an analysis of the physiological data associated with the callee and environmental data indicates that it is dark out and the callee's heartbeat is slow, the profile could, for example, specify that the incoming call be routed to voicemail since the callee is assumed to be asleep. If, for example, the environmental data suggests that the temperature is well below freezing, it could be assumed that the callee is bundled up and speech-to-text should be performed on the incoming call and the incoming communication displayed in text on communications device 30. Environmental data such as sounds and noise can be taken into consideration, and an acoustic analysis of the surrounding environment also performed to assist with call termination. For example, if the noise is above a certain threshold, the analysis module 120 can determine that it is inadvisable to forward the call to the callee since the callee would not be able to hear the incoming call. Similarly, acoustic analysis of the surrounding environment can be performed and, for example, if it is determined that the callee appears to be in a meeting, the analysis module 120, in cooperation with the profile module 170, determines appropriate call termination.

Global positioning system information can also be taken into consideration to determine call termination. For example, the current location of the callee can be determined, and when cross-referenced to the local time of the callee, a determination made whether it is appropriate to forward the call to the callee, or to terminate the call in some other manner. This GPS information can also be used to detect motion of the callee. For example, if a callee is determined to be traveling at 80 miles per hour, it may be more appropriate to route the call to voicemail instead of to communications device 30.

An event occurrence could be, for example, the callee putting down the communications device and not being collocated therewith. Thus, as with the other types of environmental data and physiological data information that can be analyzed, one or more of the handling of the incoming communication, the media type, call forwarding options, return message options and automatic call routing can be modified based on an analysis by the analysis module 120 and information in the profile module 170.

Physiological information and/or presence information can also be obtained from other individuals that are, for example, collocated with the callee and this information taken into account when determining appropriate call handling. For example, biological input from several individuals within a room can be assessed and, for example, artificial intelligence utilized to determine appropriate call handling. For example, in a hospital environment, if the intended callee is determined to be ill, yet another individual within the room appears, based on the physiological data, to be healthy and also has an associated communications device, the communication routing/type determination module can cooperate with the analysis module 120 and profile module 170 to forward the incoming communication to the other, healthy, individual in the room. More specifically, if the incoming communication to the callee is determined to be from a relative, based on information within and available to the communication control module 100, and it is known that the other individual(s) within the room is related to the callee, for example, the other individual is in the callee's address book, and is known to be a relative, the incoming communication could be forwarded to the relative instead of the callee.

As another example, assume the analysis module 120, cooperating with the data conversion module 160, as appropriate, in real-time receives one or more of physiological data and environmental data from communications device 30. The relevant data indicates the temperature is cool, and acoustic analysis indicates there are echoes in the surroundings and water appears to be running. This environmental data coupled with physiological data indicating the callee is in a relaxed state, leads the analysis module 120 to determine that the callee is otherwise "indisposed" and incoming communications should not be accepted if they are video communications or from unknown callers. However, if, for example, the caller is a known caller from within a specific set of accepted callers, the callee can establish preferences within the profile module 170 indicating that they are willing to accept an incoming, audio-only communication from that caller.

In another example, perhaps environmental data indicates that it is hot and very bright where the communication device is located. Based on this information, and knowing that it is difficult to view video communications in a very bright environment, the analysis module 120 could one or more of:

adjust the brightness of the communications device 30 in conjunction with the telephone function control module 110 or, for example, in conjunction with the messaging module 130, return a message to the caller indicating the callee's preference of receiving audio-only communications at this time.

As another example, and utilizing, for example, Bluetooth®, infrared, or other communications protocols or sensing techniques, a communications device associated with a callee can recognize that there are several other communications devices within the proximity of the callee. If, for example, an incoming call from a caller identified as a "friend" to one or more of the group of individuals within the proximity of the callee is received, and the callee is unavailable, the analysis module 120 in cooperation with the communication routing/type determination module 175 and profile module 170 could determine it is appropriate to route the incoming communication to one of the other individuals, i.e., friends, in proximity of the callee.

A profile stored within the profile module 170 can be updated and/or modified with the cooperation of the program interface 180. More specifically, the profile module 170 stores information relating to the callee, call handling, communication routing and type preferencing, telephone function preferencing, and in general any aspect of communication handling and communication device preferences. More specifically, a user can select one or more of a presence indicator, environmental data input or physiological data input and, for example, assign a threshold to the data. Additionally, an action can be assigned and associated with one or more of the presence indicators, physiological data and environmental data and specify a particular action to take upon any one or more of the data meeting the tlireshold. These various thresholds can be accessed, updated and stored via the programming interface 180 which can, for example, be associated with one or more communications devices and/or accessed via, for example, a personal computer or an interactive voice response system. The profile can further manage the collection, storage and type(s) of physiological data and environmental data that are acquired and the manner in which they are used to assist in determining communication handling and/or telephony function(s).

In addition to being able to control telephony functions, an aspect of the invention further allows a callee to specify accepted media types for incoming communications. For example, upon receipt of an incoming communication, one or more of presence information, physiological data and environmental data can be analyzed via the analysis module 120 and, in conjunction with the profile module 170, controller 140 and memory 150, the accepted media types for the callee determined. If it is determined that the incoming communication type is an accepted type, a next determination is made whether the media type is currently available to the callee. If the media type is available, a further determination is made whether automatic communication routing should be performed. If automatic communication routing should be performed, the incoming communication can be forwarded to the callee in conjunction with the multimedia communication module 185 and communication routing/type determination module 175.

However, if automatic call routing is not desired, the communication can be routed in accordance with on one or more of presence information, physiological data and environmental data. For example, if the incoming communication is a high bandwidth video communication, and the environmental and presence information indicate the callee is not in an environment capable of supplying sufficient bandwidth to adequately view the video communication, the incoming communication can be terminated in another manner, such as sent to video voicemail.

If, for example, the incoming communication is not an accepted media type or the media type is not available to the callee, a determination can be made to determine whether a message should be returned to the caller. If a message should be returned to the caller, a determination of which type of message can be made based on, for example, information in the profile module 170. For example, a message can be returned to the caller indicating that the callee's preferred communication type is presently voice, while the caller attempted to contact the callee using videophone. As an example, if the available information indicates that the callee is in a fitness center working out, the callee may not wish to receive video communications, but rather prefer traditional voice communications with a caller. In this example, a message could then be forwarded back to the caller specifying that the callee would prefer to receive only voice communications and offer the caller the option to switch to a voice-based telephone call instead of video conference. If the caller then selects the media type recommended by the message returned to the caller, the communication can then be connected to the callee. However, if the caller selects another media type, a similar analysis can be performed to see if the callee desires to accept the alternatively chosen media type.

Alternatively, the message not necessarily be returned to the caller, but instead the incoming communication routed to, for example, voicemail where the caller can leave a message. Alternatively still, based on one or more of presence information, physiological data and environmental data, a determination can be made whether to route the incoming communication to another communication device associated with the callee. If the communication is to be routed to another communication device, a similar analysis can be performed to insure the alternative communication device is capable of receiving the accepted media type, the media type is available, and the callee desires to receive that media type.

Figure 2:
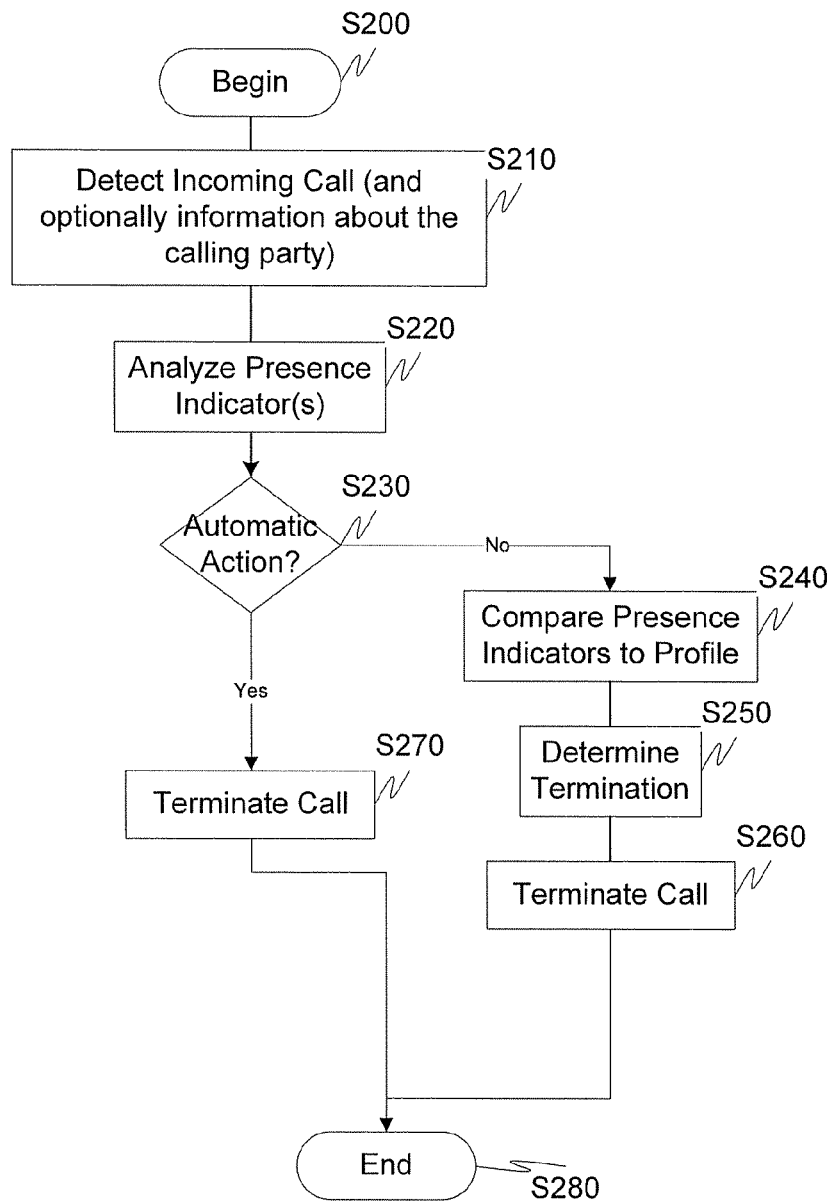
FIG. 2 is a flowchart illustrating an exemplary method of routing a call according to this invention.

FIG. 2 illustrates an exemplary method of terminating a call based on an analysis of one or more of presence indicators, physiological data and environmental data. In particular, control begins in step S200 and continues to step S210. In step S210, an incoming communication is detected—additionally, information such as caller ID can be taken into account and further used with one or more of presence indicators, physiological data and environmental data to determine appropriate call handling. For example, if it is determined that the callee is sleeping or out jogging, there are still some people from whom the callee may be willing to accept a call. For this reason, "information about the calling party" can also be utilized to assist with call termination or routing. Next, in step S220, one or more of presence indicators, physiological data and environmental data are analyzed. Then, in step S230, a determination made whether an automatic action is to occur. If an automatic action is to occur, the call can be terminated in step S270. Otherwise, one or more of the presence indicators, physiological data and environmental data can be compared to a profile in step S240. Information about the nature of the call can also be taken into account in conjunction with the other presence information. Examples of such information might include whether the calling party has marked the content as urgent and, for example, whether there is a subject header that meets certain criteria.

Next, in step S250, an appropriate termination is determined based on the analysis of one or more of the presence indicators, physiological data and environmental data. In step S260, the communication is appropriately terminated based on the determination. Control then continues to step S280, where the control sequence ends.

Figure 3:
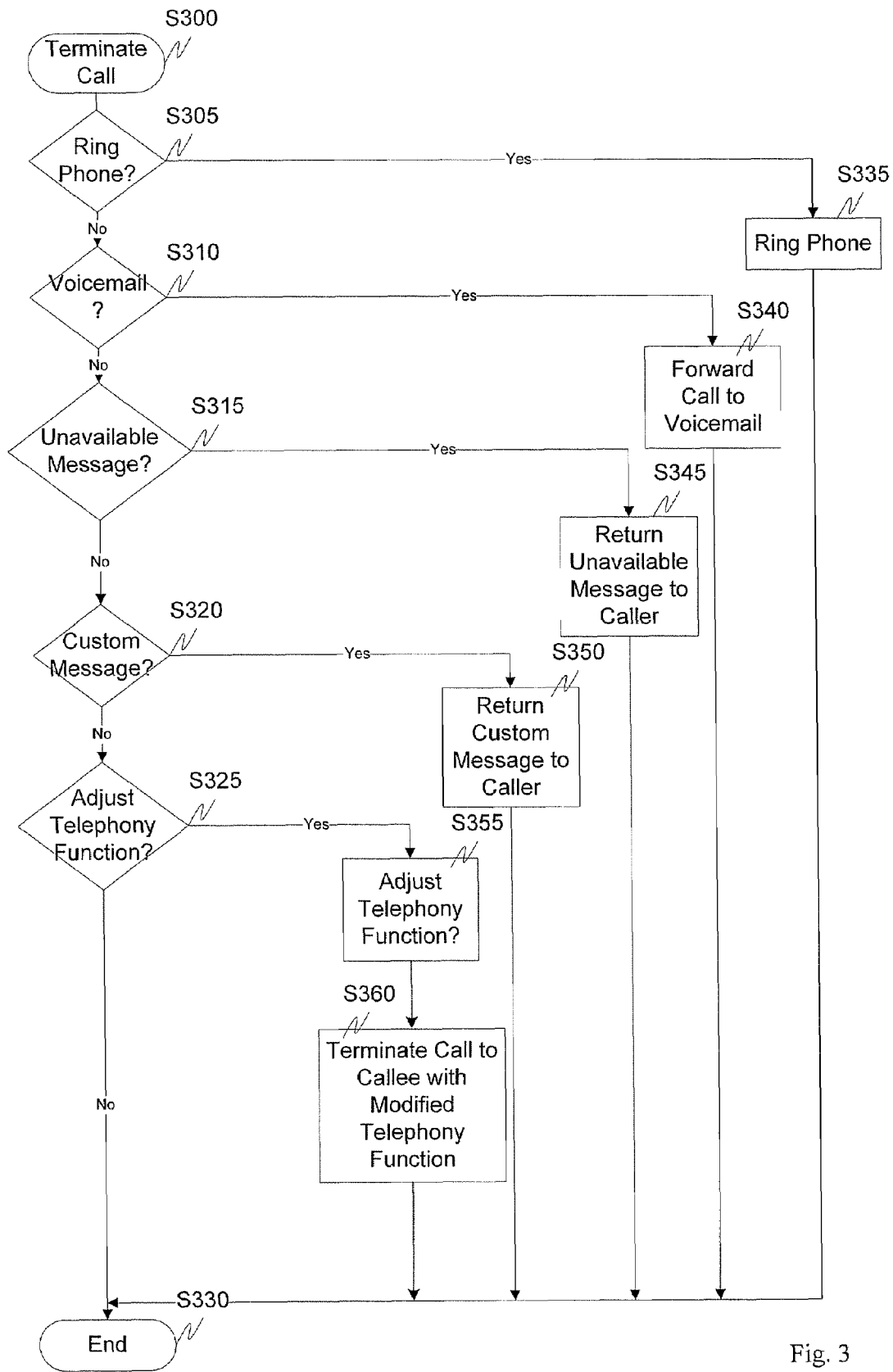
FIG. 3 is a flowchart illustrating in greater detail the terminate call portion of FIG. 2.

FIG. 3 outlines an exemplary method of terminating a call in greater detail. In particular, control begins instep S300 and continues to step S305. Instep S305, a determination is made whether to ring the phone. If the phone is to be rung, control continues to step S335, where the phone is rung with control continuing to step S330 where the control sequence ends.

In step S310, a determination is made whether to route the incoming communication to voicemail. If the incoming communication is to be routed to voicemail, control continues to step S340, where the communication is forwarded to voicemail. Control then continues to step S330, where the control sequence ends.

In step S315, a determination is made whether a message should be sent to the caller indicating that the callee is unavailable. If a message is to be sent to the caller, control continues to step S345, where an appropriate message is assembled and returned to the caller. Control then continues to step S330 where the control sequence ends.

In step S320, a determination is made whether a custom message should be returned to the caller. If a custom message is to be returned to the caller, control continues to step S350, where the custom message is determined and forwarded to the caller. Control then continues to step S330, where the control sequence ends. For example, a callee can record custom messages in their profile and, for example, upon receipt of a communication from a specific caller, the custom message returned to that caller. This custom message can, for example, be more specific or personalized than a general message returned to, for example, an unknown caller.

In step S325, a determination is made whether one or more telephony functions are to be adjusted. If one or more telephony functions are to be adjusted, control continues to step S355 where, for example, and based on the callee's profile, the telephony functions are modified and the call terminated, in step S360, to the callee in accordance with the modified telephony functions. Control then continues to step S330, where the control sequence ends.

Figure 4:
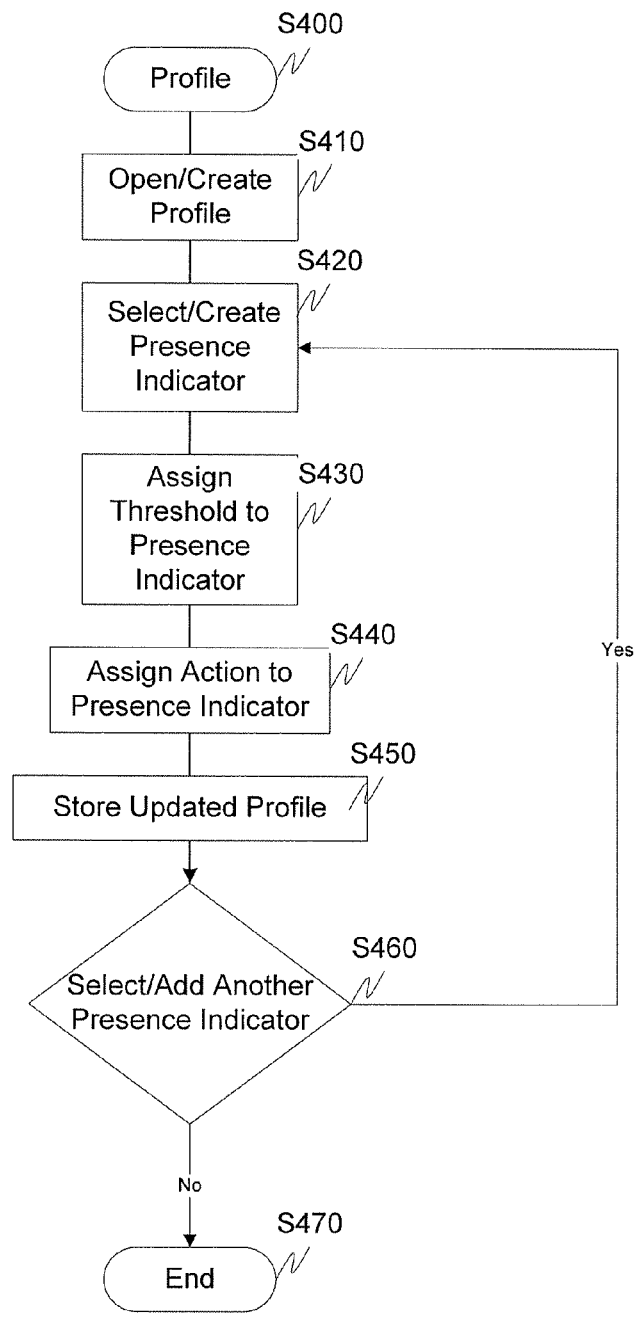
FIG. 4 is a flowchart outlining an exemplary method of creating and/or modifying a profile according to this invention.

FIG. 4 outlines an exemplary method of creating and/or modifying a profile according to an exemplary embodiment of this invention.

In particular, control begins in step S400 and continues to step S410. In step S410, a profile is opened and/or created. Next, in step S420, one or more of a presence indicator, environmental indicator, or physiological indicator is selected. Next in step S430, threshold or matrix of thresholds based on one or more of the presence indicator, environmental data and physiological information is assigned. Then, in step S440, an action is associated with the threshold criteria having been met. In step S450, the updated profile is stored and in step S460 determination made whether the profile range should be added and/or modified. If another profile change should be added or modified, control jumps back to step S420. Otherwise, control continues to step S470, where the control sequence ends.

Figure 5:
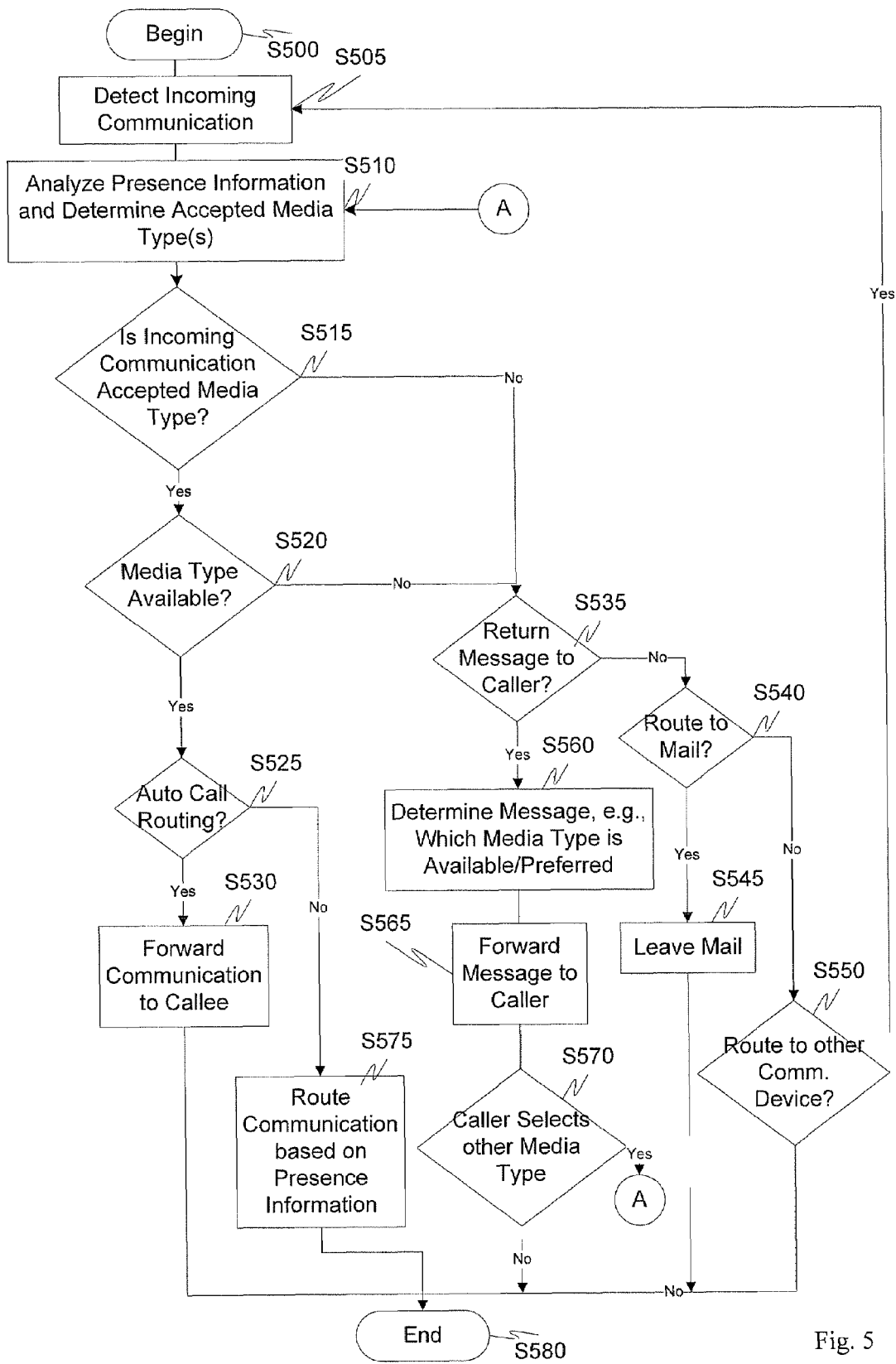
FIG. 5 is a flowchart illustrating an exemplary method of determining and routing a preferred communication media type according to this invention.

FIG. 5 illustrates an exemplary method of determining accepted media types and call routing based on one or more of the presence information, physiological information and environmental information. In particular, control begins in step S500 and continues to step S505. In step S505, an incoming communication is detected. Next, in step S510, one or more of presence information, environmental data and physiological data are analyzed and, for example, based on information in the profile, a determination made whether the incoming communication is an accepted media type. Next, in step S515, if the incoming communication is an accepted media type, a further determination is made in step S520 whether the media type is available to the callee. If the media type is available to the callee, a further determination is made in step S525 whether automatic communication routing should be performed. If automatic communication routing is to be performed, control continues to step S530, where the communication is forwarded to the callee, with control continuing to step S580 where the control sequence ends.

Alternatively, if automatic communication routing is not to be performed, control jumps to step S575, where the communication is routed, for example, based on one or more of presence information, physiological data, environmental data, and information within the callee's profile. Control then continues to step S580, where the control sequence ends.

If a determination is made in step S515 that the incoming communication is not an accepted media type, or in step S520 that the media type is not available, control jumps to step S535.

In step S535, a determination is made whether a message should be returned to the caller. If a message is to be returned to the caller, control continues to step S560 where a message is determined. As discussed previously, this message can include information such as which media type is currently being accepted, available or preferred by the callee. Next, in step S565, this message can be forwarded back to the caller where, in step S530, the caller can select another media type that may or may not be in accordance with that specified or recommended in the message. If another media type is selected by the caller, control jumps back to step S510. Otherwise, control continues to step S580, where the control sequence ends. Alternatively, communication can be routed to, for example, mail or other options given to the caller for termination of the call.

If in step S535 a message is not to be returned to the caller, control continues to step S540, where a determination is made whether to route the communication to mail. If the communication is to be routed to mail, control continues to step S545, where the caller can leave a mail, with control continuing to step S580, where the control sequence ends. Alternatively, if a communication is not to be routed to mail, control continues to step S550, where a determination is made whether the communication should be routed to another communication device. If a communication is to be routed to another communication device, control jumps back to step S505. Otherwise, control continues to step S580, where the control sequence ends.

As will be appreciated, the portion of the communications system illustrated herein can also comprise other well known components which will not be discussed herein in detail. For example, the various portions of the communications system can further include one or more telephony switch/media servers that can be any architecture for directing communications to one or more communication devices. The network 10 can and typically includes proxies, registrars, switches and routers that are well known. Communication devices for the caller and callees can be any communication device suitable for the network to which they are connected. For example, the communications devices can be any wired or wireless phone such as IP hardphones, IP softphones, Personal Digital Assistants or PDAs, Personal Computers or PCs, laptops, mobile phones, traditional PSTN type phones, cellular phones, video phones, or any combination thereof. A typical communications device comprises a handset, or headset, and a cradle assembly. The cradle assembly typically comprises a display, a nonprogrammable or hard keypad and programmable or soft keypad.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a telephone, mobile phone, PDA, a wired and/or wireless wide/local area network system, a satellite communication system, or the like, or on a separate programmed general purpose computer having a communications device(s) or in conjunction with any compatible communications protocol(s).

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and tecluniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems and methods for communication management and selection of telephony functions. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A telephone function modification method comprising:
    obtaining physiological information from one or more individuals associated with an endpoint;
    analyzing, by a processor, one or more of the physiological information, callee presence information and environmental data associated with the callee to determine whether the callee desires to receive a call;
    modifying a telephony function selected from a plurality of telephony functions based on the analysis; and
    selecting one of a plurality of termination destinations for a communication based on the analysis of the physiological information, and one or more of the callee presence information and the environmental data, to include the modified telephony function.

2. The method of claim 1, wherein the physiological information is one or more of heartbeat information, blood pressure information, temperature information, activity information, and physiological status data about a callee.

3. The method of claim 1, wherein the telephony function is one or more of ringing a phone, forwarding a call, forwarding a call to mail, returning a message to the caller, returning a custom message to the caller, adjusting a communications device functionality, terminating a call, routing a call to another endpoint, managing a media type and automatic routing.

4. The method of claim 1, further comprising determining if a media type is available and modifying the telephone function based on the determining step.

5. The method of claim 1, further comprising determining if a preferred media type is available and one or more of modifying the telephone function based on the determining step and forwarding a message.

6. The method of claim 1, further comprising routing the communication to the termination destination.

7. The method of claim 1, further comprising comparing the physiological information to a profile associated with a callee.

8. The method of claim 1, further comprising managing a profile that is used to assist with the analysis of the physiological information.

9. A communication control system comprising:
    a data conversion module configured to obtain physiological information associated with one or more individuals associated with an endpoint;
    an analysis module configured to analyze the physiological information to determine whether a callee desires to receive a call;
    a telephony function control module configured to modify a telephony function selected from a plurality of telephony functions based on the analysis; and
    a communication routing determination module configured to select one of a plurality of termination destinations for a communication based on the analysis of the physiological information, to include the modified telephony function.

10. The module of claim 9, wherein the physiological information is one or more of heartbeat information, blood pressure information, temperature information, activity information, and physiological status data about a callee.

11. The module of claim 9, wherein the telephony function is one or more of ringing a phone, forwarding a call, forwarding a call to mail, returning a message to the caller, returning a custom message to the caller, adjusting a communications device functionality, terminating a call, routing a call to another endpoint, managing a media type and automatic routing.

12. The module of claim 9, further comprising a multimedia communication module configured to determine if a media type is available and to modify the telephone function based on the determining step.

13. The module of claim 9, further comprising a multimedia communication module configured to determine if a preferred media type is available and to one or more of modify the telephone function based on the determination and to forward a message.

14. The module of claim 9, further comprising a controller adapted to route the communication to the termination destination.

15. The module of claim 9, further comprising a profile module configured to compare the physiological information to a profile associated with a callee.

16. The module of claim 9, further comprising a profile module that manages a profile that is used to assist with the analysis of the physiological information.

17. The module of claim 9, wherein the analysis module is further configured to analyze environmental information associated with the endpoint.

18. A telephone function modification method comprising:
obtaining one or more of environmental information and physiological information associated with one or more individuals proximate to an endpoint;
analyzing, by a processor, the one or more of environmental information and physiological information to determine whether a callee desires to receive a call;
modifying a telephony function selected from a plurality of telephony functions based on the analysis; and
selecting one of a plurality of termination destinations for a communication based on the analysis of the one or more of environmental information and physiological information to include the modified telephony function.

19. The method of claim 18, wherein the environmental data is one or more of light, temperature, sounds, noise, acoustic analysis, global positioning system information, time, motion, event occurrence and status or presence information related to one or more of other persons and communications devices.

20. The method of claim 18, wherein the physiological information is one or more of heartbeat information, blood pressure information, temperature information, activity information, and physiological status data about a callee.

21. A telephone function modification method comprising:
obtaining one or more physiological measures of at least a called party;
obtaining at least one of:
measures of environmental information associated with a called party's endpoint, and
one or more characteristics of a calling party; and
analyzing, by a processor, the called party's physiological information in combination with one or more of the environmental information and the characteristics of the calling party to determine whether the called party desires to receive a call;
modifying a telephony function based selected from a plurality of telephony functions on the analysis; and
selecting one of a plurality of termination destinations and response for a communication based on the analysis.

* * * * *